US009393982B2

(12) United States Patent
Tomasi et al.

(10) Patent No.: US 9,393,982 B2
(45) Date of Patent: Jul. 19, 2016

(54) FOLDING CHASSIS FOR PUSH-CHAIRS, BABY CARRIAGES AND THE LIKE

(71) Applicant: L'INGLESINA BABY S.P.A., Altavilla Vicentina (IT)

(72) Inventors: Ivan Tomasi, Sovizzo (IT); Roberto Gorza, Feltre (IT)

(73) Assignee: L'INGLESINA BABY S.P.A., Altavilla Vincentina (IT)

( * ) Notice: Subject to any disclaimer, the term of this patent is extended or adjusted under 35 U.S.C. 154(b) by 0 days.

(21) Appl. No.: 14/366,073

(22) PCT Filed: Dec. 18, 2012

(86) PCT No.: PCT/EP2012/075976
§ 371 (c)(1),
(2) Date: Jun. 17, 2014

(87) PCT Pub. No.: WO2013/092600
PCT Pub. Date: Jun. 27, 2013

(65) Prior Publication Data
US 2014/0361518 A1 Dec. 11, 2014

(30) Foreign Application Priority Data

Dec. 20, 2011 (IT) .............................. VR2011A0226

(51) Int. Cl.
*B62B 1/00* (2006.01)
*B62B 7/06* (2006.01)
*B62B 7/08* (2006.01)

(52) U.S. Cl.
CPC ... *B62B 7/06* (2013.01); *B62B 7/08* (2013.01); *B62B 2205/20* (2013.01)

(58) Field of Classification Search
CPC .......... B62B 7/00; B62B 7/006; B62B 7/145; B62B 7/06; B62B 7/04; B62B 7/062; B62B 7/064; B62B 7/066; B62B 7/08; B62B 7/083; B62B 7/086; B62B 7/10; B62B 9/20; B62B 2205/20; B62B 2205/22
USPC ................. 280/650, 639, 642, 647, 649, 658, 280/47.38
See application file for complete search history.

(56) References Cited

U.S. PATENT DOCUMENTS 4,272,100 A * 6/1981 Kassai ...................... B62B 7/08
280/47.4
4,732,406 A * 3/1988 Kassai ...................... B62B 7/08
280/47.38

(Continued)

FOREIGN PATENT DOCUMENTS

CN 201082719 Y 7/2008
DE 20202272 U1 7/2002

(Continued)

OTHER PUBLICATIONS

Chinese Office Action issued Nov. 10, 2015 re: Application No. 20128006312.6; pp: 1-10; citing: DE20302809U1, WO 2010/143301A1, FR2603240A1, U.S. Pat. No. 5,622,376A, WO2006/136921A2 and CN201082719Y.

(Continued)

*Primary Examiner* — James M Dolak
(74) *Attorney, Agent, or Firm* — Cantor Colburn LLP

(57) ABSTRACT

A folding chassis (1) for push-chairs, baby carriages and the like, comprising—a lower frame (2), which has at least one front post (2a) and at least one rear post (2b), which are connected in a lower region to respective wheel assemblies (3a, 3b);—at least one upper post (4), which supports grip means (4a) and can move with a combined rotary and translational motion with respect to the lower frame (2) during the transition of the chassis from an extended open condition to a collapsed closed condition;—at least one interconnection linkage (5), which is articulated rotatably to the upper post (4) and to the rear post (2b) about a first articulation axis (101) and a second articulation axis (102);—means (7) for kinematic interconnection between the upper post (4) and the lower frame (2);—the interconnection linkage (5) and the kinematic interconnection means (7) being adapted to determine the relative motion between the front post or posts, the rear post or posts and the upper post or posts (4) during the transition of the chassis (1) from the extended open condition to the collapsed closed condition and vice versa,—locking means (10) which can be activated, as a consequence of the transition of the chassis (1) from the collapsed closed condition to the extended open condition, and are adapted to keep the chassis (1) in the extended open condition,—a deactivation device (20), which is adapted to deactivate on command the locking means (10) in order to allow the transition of the chassis (1) from the extended open condition to the collapsed closed condition, at least one grip device (30) and at least one actuation device (31) being associated with the lower frame (2), said actuation device (31) being able to be actuated, with the locking means (10) deactivated and the grip device (30) gripped by the user, so as to move, by means of a movement of a linkage (5) and/or of an upper post (4), the first articulation axis (101) away from the rear post or posts (2b), so as to move beyond a position of equilibrium of the chassis (1) beyond which the chassis (1) tends to move towards the collapsed closed condition due to its own weight.

17 Claims, 10 Drawing Sheets

(56) References Cited

U.S. PATENT DOCUMENTS

| | | | |
|---|---|---|---|
| 5,622,376 A | 4/1997 | Shamie | |
| 6,422,587 B1* | 7/2002 | Yamazaki | B62B 7/06 280/42 |
| 6,581,957 B1* | 6/2003 | Lan | B62B 9/104 280/47.38 |
| 6,918,608 B2* | 7/2005 | Crisp | B62B 7/08 280/47.38 |
| 7,883,104 B2* | 2/2011 | Driessen | B62B 7/08 280/642 |
| 8,246,072 B2* | 8/2012 | Groppo | B62B 7/08 280/642 |
| 8,366,141 B2* | 2/2013 | Crisp | B62B 7/123 280/47.38 |
| 8,444,170 B2 | 5/2013 | Chen et al. | |
| 8,696,015 B2* | 4/2014 | Karremans | B62B 7/062 280/642 |
| 8,733,784 B2* | 5/2014 | Kobayashi | B62B 7/062 280/647 |
| 9,168,939 B2* | 10/2015 | Gu | B62B 9/203 |
| 2004/0195805 A1* | 10/2004 | Yamazaki | B62B 7/06 280/647 |
| 2009/0121454 A1* | 5/2009 | Tomasi | B62B 7/08 280/642 |

FOREIGN PATENT DOCUMENTS

| | | |
|---|---|---|
| DE | 20302809 U1 | 5/2003 |
| DE | 202008003410 U1 | 7/2008 |
| FR | 2603240 A1 | 3/1998 |
| TW | 201111212 A | 4/2011 |
| WO | 2006136921 A2 | 12/2006 |
| WO | 2010143301 A1 | 12/2010 |

OTHER PUBLICATIONS

International Search Report for corresponding application PCT/EP2012/075976 filed Dec. 18, 2012; Mail date Feb. 28, 2013.
Written Opinion for corresponding application PCT/EP2012/075976 filed Dec. 18, 2012; Mail date Feb. 28, 2013.

* cited by examiner

FOLDING CHASSIS FOR PUSH-CHAIRS, BABY CARRIAGES AND THE LIKE

CROSS REFERENCE TO RELATED APPLICATIONS

This application is the U.S. national phase of International Application No. PCT/EP2012/075976 filed on 18 Dec. 2012 which claims priority to Italian Patent Application No. VR2011A000226 filed on 20 Dec. 2011, all of which said applications are herein incorporated by reference in their entirety.

TECHNICAL FIELD

The present invention relates to a folding chassis for push-chairs, baby carriages and the like.

BACKGROUND

Folding chassis for push-chairs or baby carriages are known which are essentially constituted by a lower frame, which comprises one or two front posts and one or two rear posts, which support in a lower region respective wheel assemblies, and by at least one upper post, known in the jargon as a handle tube, which terminates in an upper region in the grip or handle of the chassis and can move, with respect to the lower frame, with a movement that has a translational component and a rotary component, in order to allow the execution of the closing or compaction of the chassis.

With particular reference to what is called a clamshell-folding chassis, a typical constructive solution entails that the front and rear posts are mutually pivoted about an articulation axis, whereas the handle tube or tubes is/are kinematically connected to the lower frame by means of at least one linkage for connection to the respective rear posts, and by virtue of kinematic interconnection means constituted by at least one upper traction element that connects the handle tube or tubes to a front region of the rear post or posts and at least one lower fraction element that connects the rear post or posts to the upper post or posts.

This constructive solution allows, in the closing step of the chassis, to make the front posts approach the corresponding rear posts in an angular position while the handle tubes, thanks to a combined rotary and translational motion, arrange themselves, in the closed condition, substantially parallel to the rear posts with the handle arranged on the side opposite to the wheels.

Locking of the chassis in the open condition can be achieved by providing locking means that operate:

between the handle tube and the respective rear post in the contact region, —between the linkage and the handle tube, between the handle tube and the upper traction element,
between the linkage and the rear post.

The chassis has, during the transition from the extended open condition to the collapsed closed condition and vice versa, an equilibrium or "under fulcrum" point, determined by the distribution of the weights and the mutual arrangement of the relative rotation centers between the linkage and the handle tube, between the upper traction element and the handle tube and between the linkage and the rear post.

In practice, when the equilibrium point or subfulcrum point is passed, during the closure of the chassis, the weight of the chassis itself tends to facilitate the closure of the chassis, whereas during the opening of the chassis, when the equilibrium point or subfulcrum point is passed, the weight of the chassis tends to facilitate its opening.

However, it is clear that, during the initial step of the action intended to move the chassis from the extended condition to the collapsed condition, it is necessary, once the locking means have been deactivated, to force the movement of the handle tube in order to move toward the equilibrium point by means of an action that is not particularly practical and intuitive, since the user has to guide, by operating the grip, the handle tubes to perform a combined rotary and translational motion, in some cases even requiring the help of a foot.

BRIEF SUMMARY

The aim of the present invention is to solve the problem described above by providing a folding chassis particularly for push-chairs, baby carriages and the like, which has an extremely simplified structure with respect to currently known solutions and is adapted to make the transition of the chassis from the extended open condition to the collapsed closed condition more practical.

Within this aim, the provides a folding chassis that is capable of allowing, at the same time, the release of the locking means and the transition from the extended condition to the collapsed condition.

The invention further provides a folding chassis that is easy to use and offers the greatest assurances of reliability and safety in operation.

The present invention also provides a folding chassis that can be manufactured at low production cost.

BRIEF DESCRIPTION OF THE DRAWINGS

Further characteristics and advantages of the present invention will become more apparent from the description of some preferred but not exclusive embodiments of the folding chassis according to the invention, illustrated by way of non-limiting example with the aid of the accompanying drawings, wherein.

DETAILED DESCRIPTION

Figure 1:
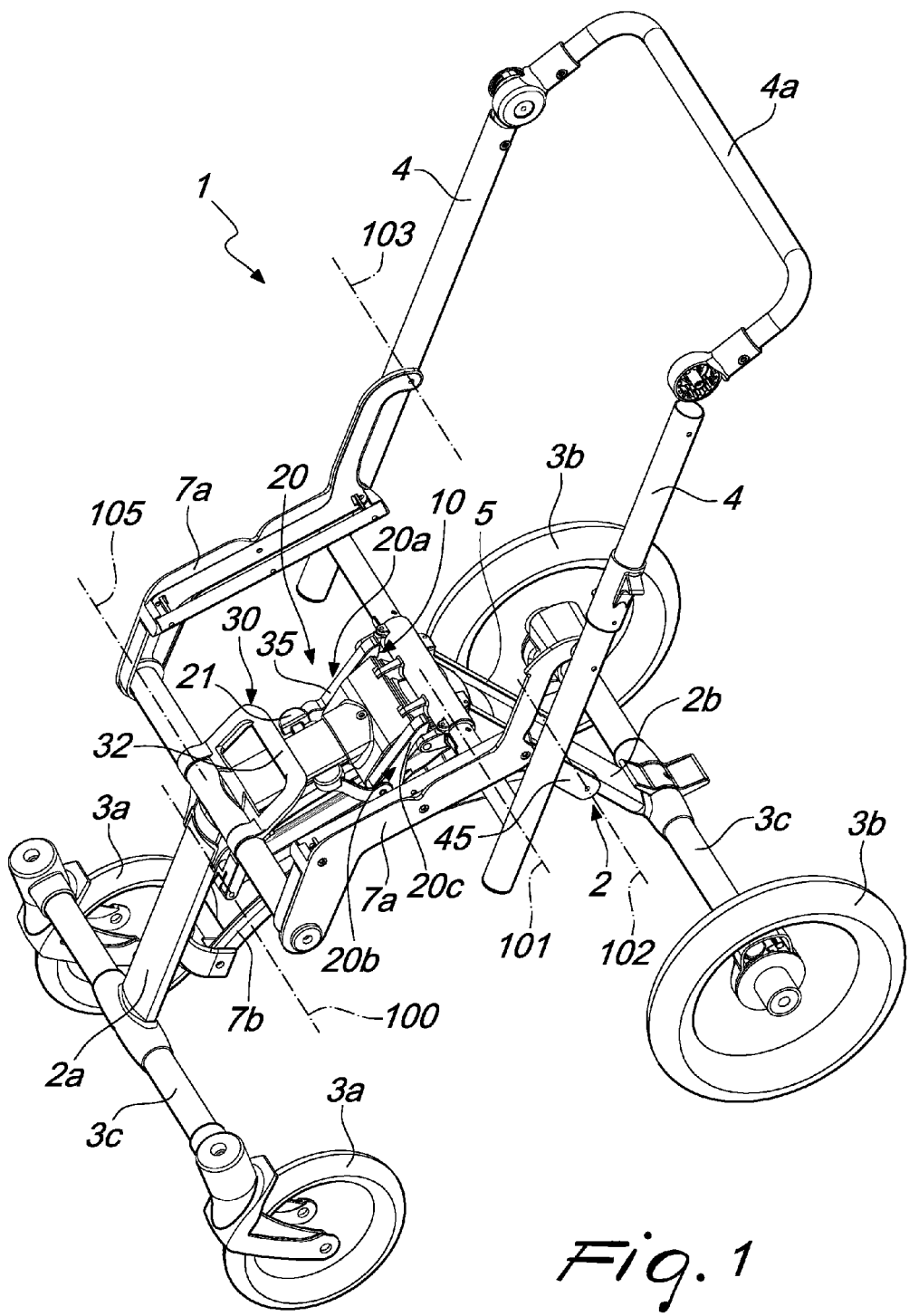
FIG. 1 is an elevated perspective view of a chassis in the extended condition.
Figure 2:
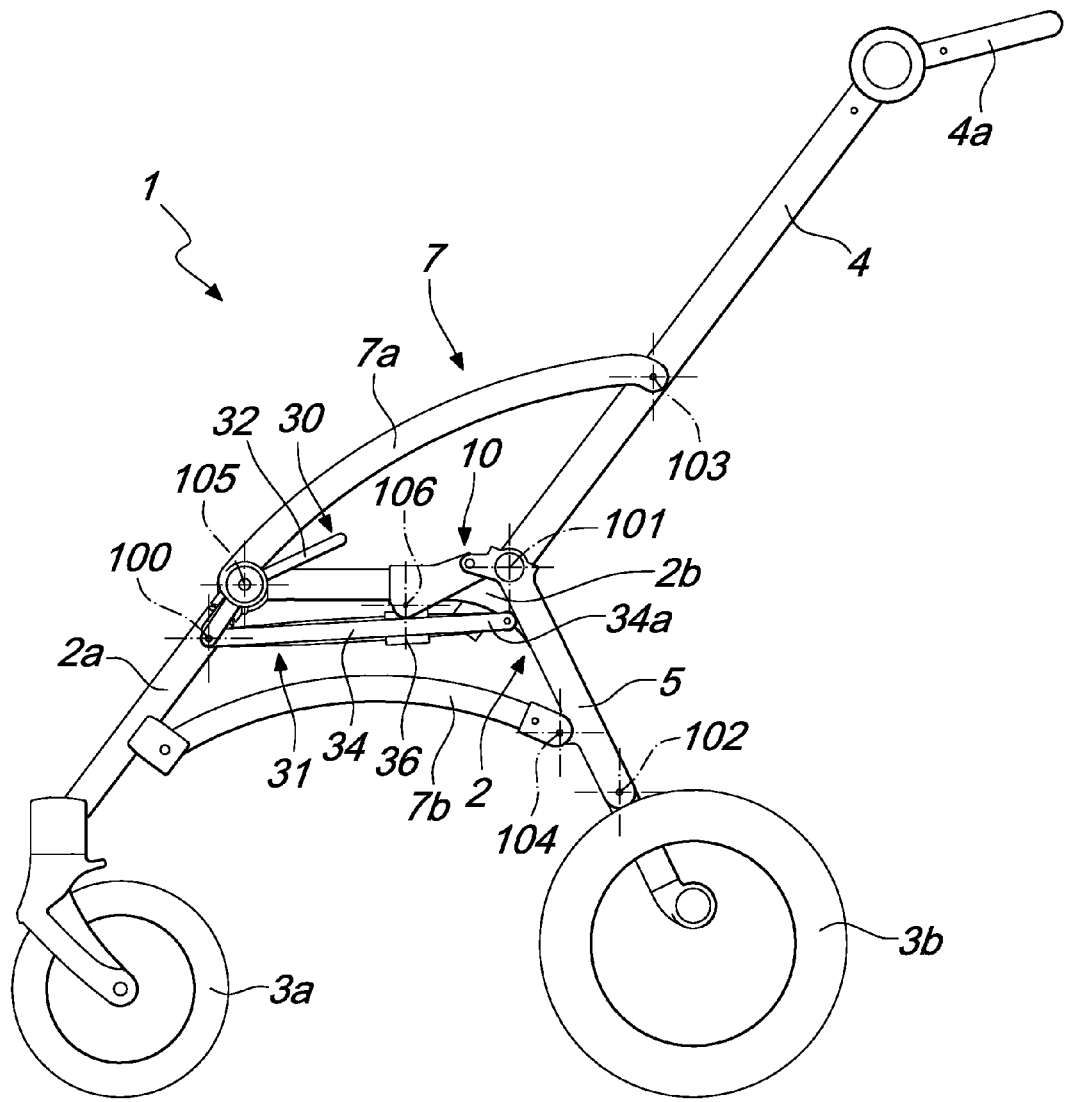
FIGS. 2 to 5 are schematic lateral elevation views of the chassis according to the invention in a sequence of steps comprised between the extended open condition and the collapsed closed condition.

In the exemplary embodiments that follow, individual characteristics, given in relation to specific examples may actually be interchanged with different characteristics that exist in other exemplary embodiments.

Moreover, it is noted that anything found to be already known during the patenting process is understood not to be claimed and to be the subject of a disclaimer.

With reference to the above cited figures, a folding chassis, generally designated by the reference numeral 1, particularly for push-chairs, baby carriages and the like, comprises a lower frame 2, which has at least one front post 2a and at least one rear post 2b, which are connected in a downward region to respective wheel assemblies 3a, 3b.

Conveniently, the front post or posts 2a are articulated rotatably to the rear post or posts 2b about at least one interconnection axis 100.

In the illustrated embodiment, the lower frame 2 comprises a front post 2a and a rear post 2b, each one of which is connected, at the respective free ends, to a supporting cross-member 3c for two respective wheel assemblies 3a, 3b.

Nothing prevents, however, the lower frame 2 from having different structures, for example constituted by a pair of front posts 2a and a pair of rear posts 2b arranged on the sides of the folding chassis 1 or by a single front post 2a connected to two rear posts 2b or vice versa.

The folding chassis 1 comprises, moreover, at least one upper post 4, which supports grip means 4a and can move with a combined rotary and translational motion with respect to the lower frame 2 during the transition of the folding chassis 1 from an extended open condition to a collapsed closed condition and vice versa.

The folding chassis 1 comprises at least one interconnection linkage 5, which is articulated rotatably, conveniently at its end portions, to a respective upper post 4 and to a respective rear post 2b about a first articulation axis and a second articulation axis, designated by the reference numerals 101 and 102.

With reference to the embodiment shown in the figures, the first articulation axis 101 and the second articulation axis 102 are arranged substantially parallel to the interconnection axis 100.

The lower frame 2 is connected to the or to each upper post 4 by kinematic interconnection means 7, which conveniently, with reference to the embodiment shown in the figures, are constituted by at least one upper traction element 7a and by at least one lower traction element 7b.

The or each upper traction element 7a is pivoted to the rear post 2b at a front region thereof arranged proximate to the interconnection axis 100 and is coupled rotatably to at least one respective upper post 4 about a third articulation axis 103, which is parallel to the interconnection axis 100.

The or each lower traction element 7b is instead pivoted to at least one front post 2a and is coupled rotatably to the interconnection linkage 5 about a fourth articulation axis 104, which is also parallel to the interconnection axis 100.

The interconnection linkage or linkages 5 and the kinematic interconnection means 7 are, in particular, adapted to determine the relative movement between the front post or posts 2a, the rear post or posts 2b and the upper post or posts 4 during the transition of the folding chassis 1 from the extended open condition to the collapsed closed condition and vice versa.

The folding chassis 1 is further provided with locking means 10 which can be activated typically in an automatic manner following the transition of the chassis 1 from the collapsed closed condition to the extended open condition and are adapted to keep the chassis 1 in the extended open condition during normal use.

For allowing the transition of the folded chassis 1 from the extended open condition to the collapsed closed condition there is a deactivation device 20, which is adapted to deactivate on command the locking means 10.

Merely by way of example, the locking means 10 can operate between the upper post 4 and the respective rear post 2b in the contact region (such as for example in the embodiment shown in the figures), between the linkage 5 and the upper post 4, between the upper post 4 and the respective upper traction element 7a or between the linkage 5 and the respective upper post 2b.

According to the present invention, at least one grip device 30 and at least one actuation device 31 are associated with the lower frame 2.

Advantageously, the grip device 30 is associated directly with the lower frame 2.

Conveniently, the actuation device 31 also is associated directly with the lower frame 2.

The actuation device 31 can be actuated by the user with the locking means 10 previously deactivated and with the grip device 30 gripped, in order to move, by means of a movement of the at least one linkage 5 and/or of the at least one upper post 4, the first articulation axis 101 away from the rear post 2b, so as to move beyond a position of equilibrium of the folding chassis 1 beyond which the folding chassis 1 tends to move towards the collapsed closed condition due to its own weight.

Specifically, in order to ensure effectively the closure of the chassis 1 it can be convenient for the user to apply an action to lift the lower frame 2 by means of the grip device 30.

According to a preferred embodiment, the grip device 30 comprises a handle 32, which is articulated to the lower frame 2.

As an alternative, the handle 32 can be mounted so that it can move along a movement path on the lower frame 2.

Merely by way of example, the movement path can comprise a straight or curvilinear path.

Advantageously, the handle 32 can move, with respect to the lower frame 2, so as to shift between an inactive condition and a lifting condition.

In order to make the transition of the folding chassis 1 from the extended open condition to the collapsed closed condition particularly practical, the actuation device 31 is connected kinematically to the handle 32.

Delving further into the details, the actuation device 31 can be actuated automatically following the transition of the handle 32 from the inactive condition to the lifting condition.

Figure 3:
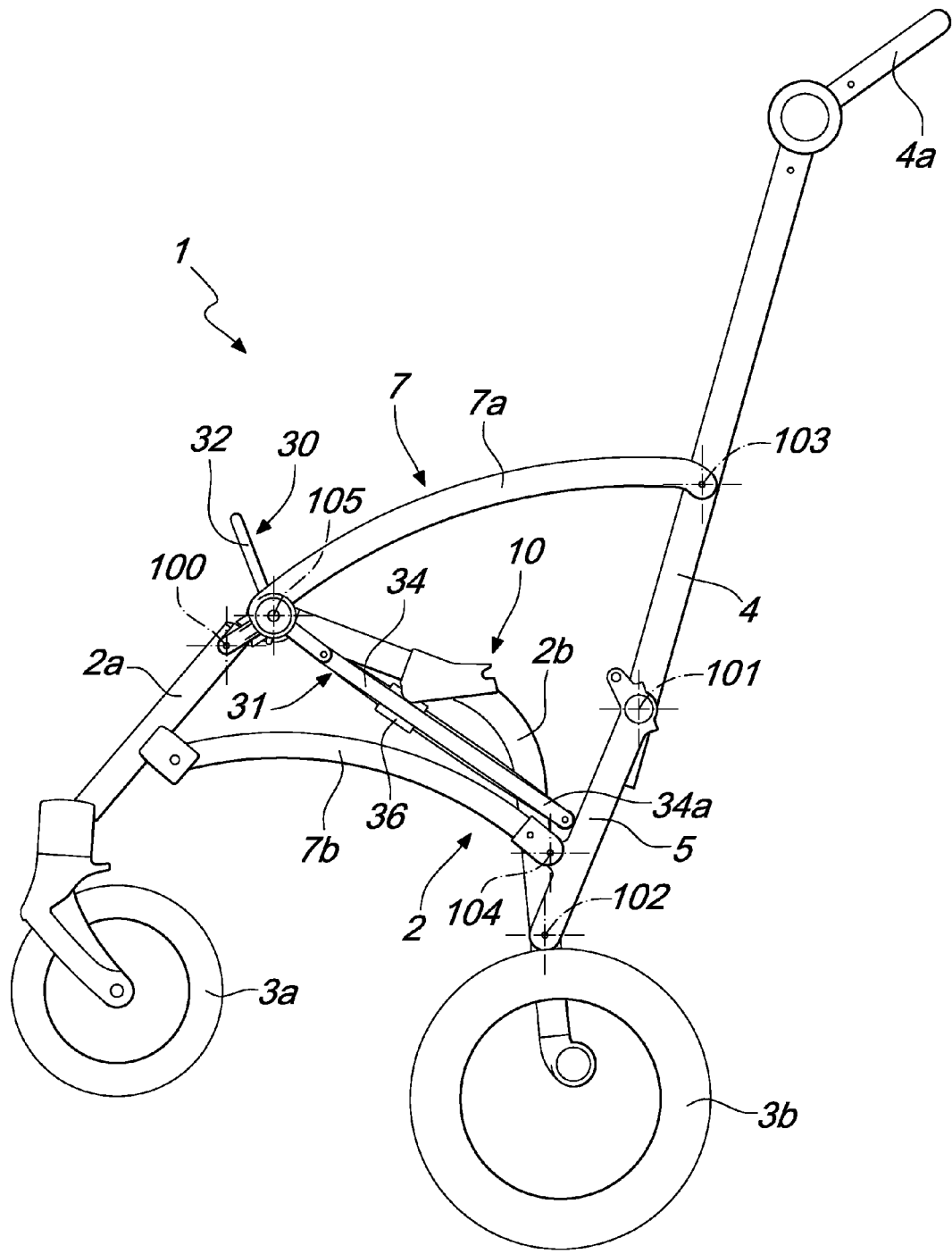
Figure 4:
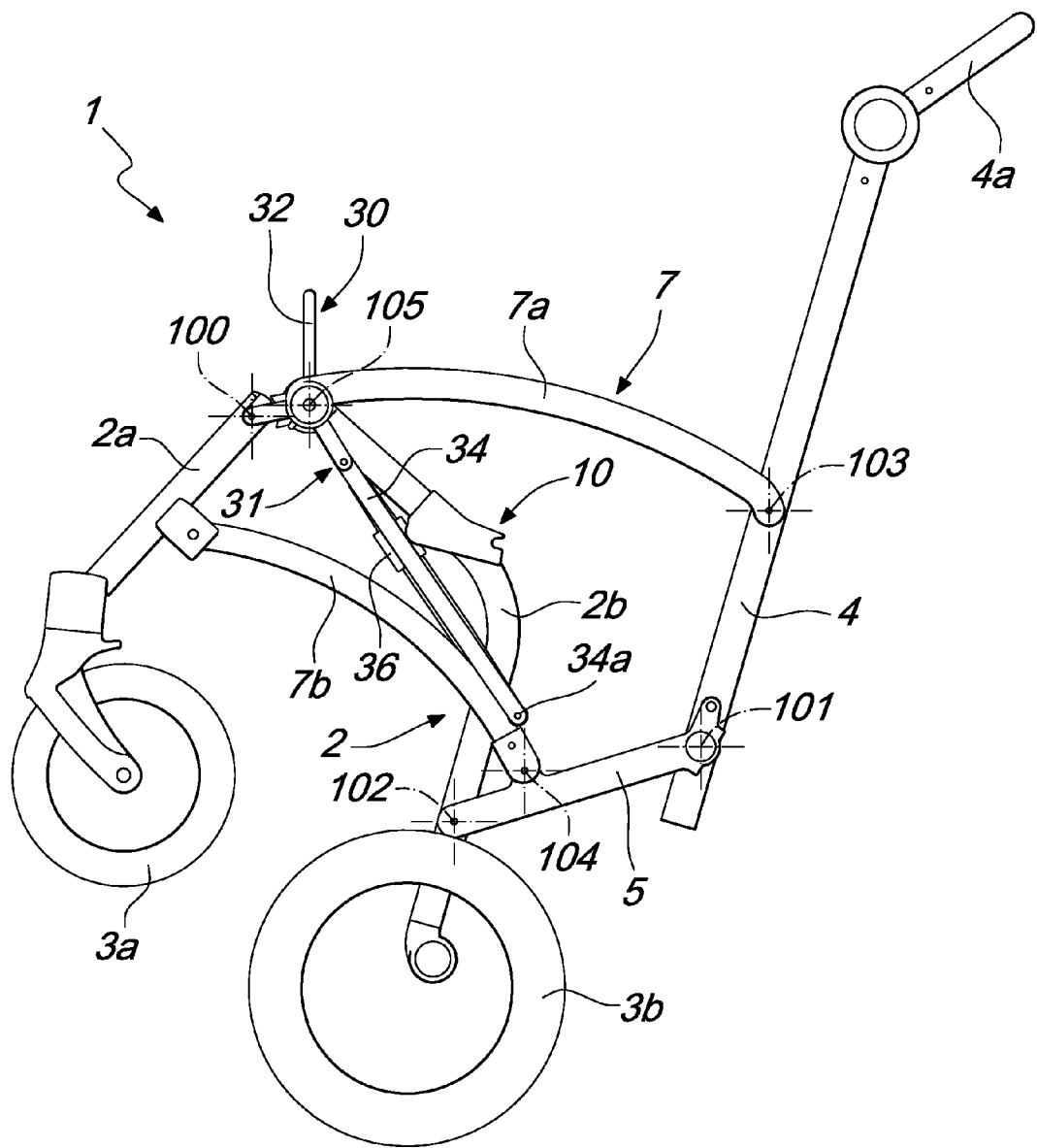
Figure 5:
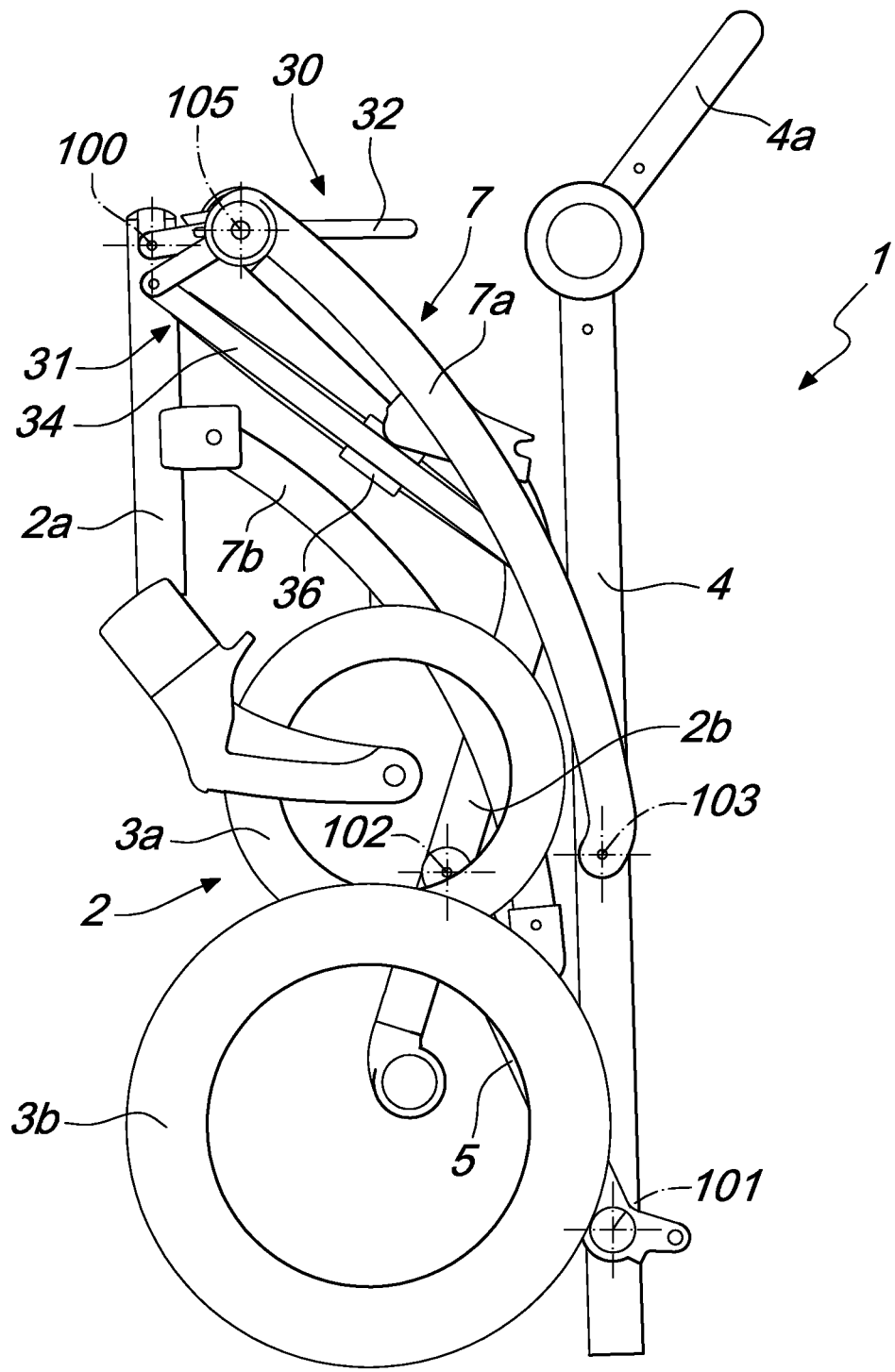
Figure 6:
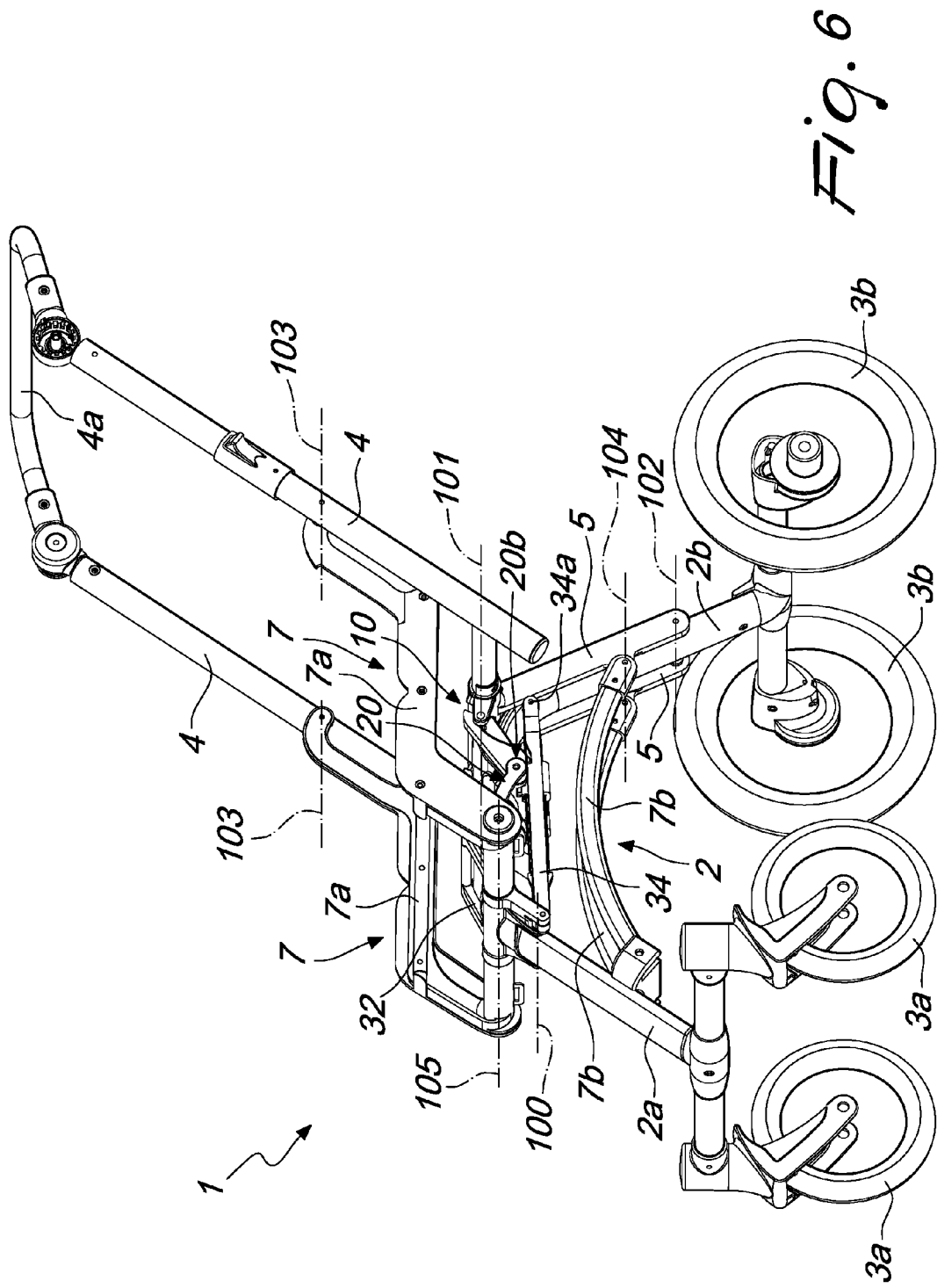
FIGS. 6 to 9 are perspective views of the chassis according to the invention in a sequence of steps comprised between the extended open condition and the collapsed closed condition.
Figure 7:
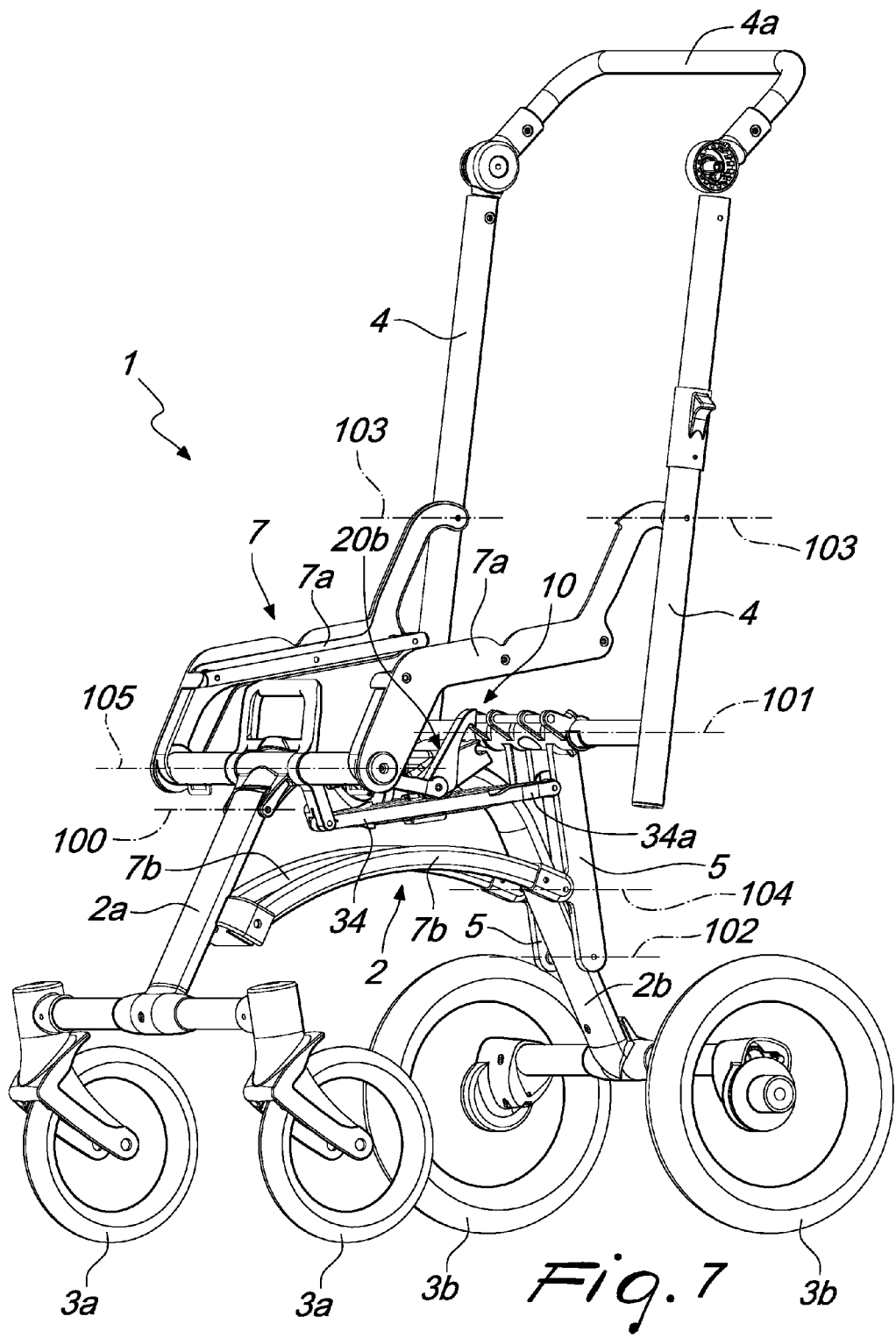
Figure 8:
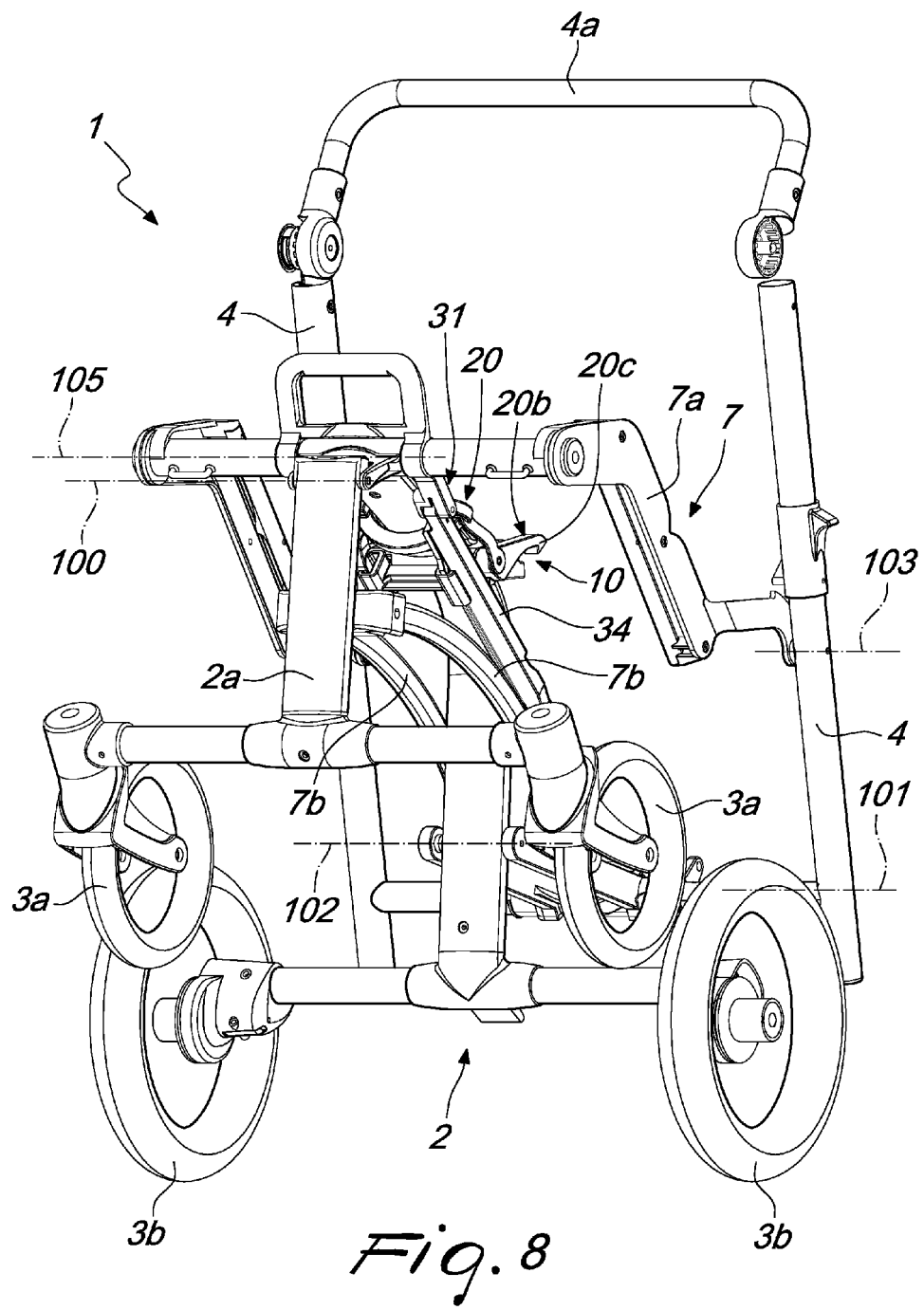
Figure 9:
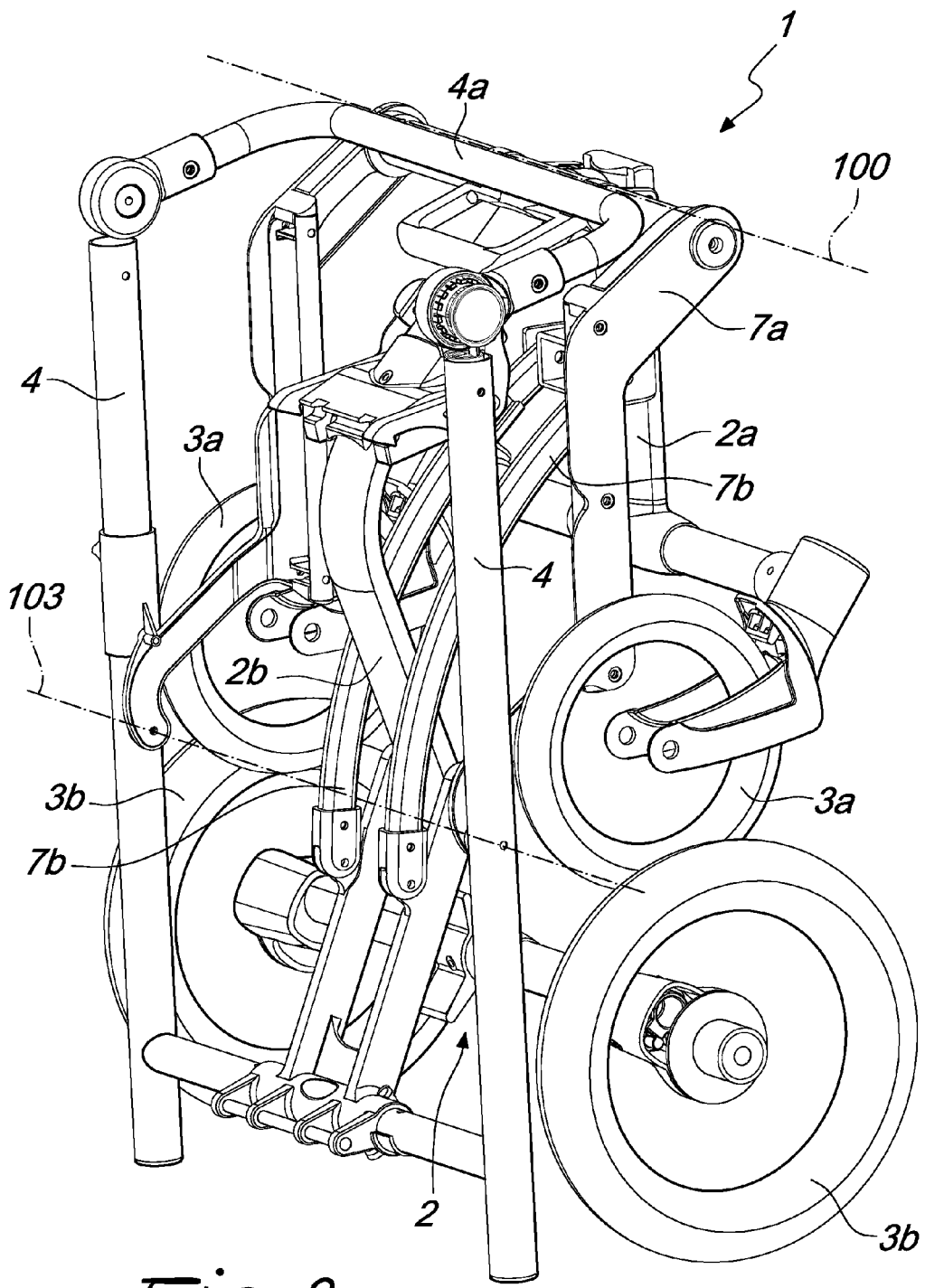

With reference to the illustrated embodiment, the actuation device 31 comprises a lever system which is connected and/or actuated by the handle 32 and has, advantageously, at least one strut 34 which terminates in a working end 34a, adapted to operate by pushing against the interconnection linkage 5 in order to move the pivoting axis 101 beyond the equilibrium condition (shown schematically in FIG. 3).

Advantageously, the strut 34 is guided along a guiding receptacle 36 which is articulated to the lower frame 2.

Moreover, the device 20 for deactivating the locking means 10 may also be associated with the handle 32 or connected to it.

In this regard, the deactivation device 20 has a first deactivation element 20b which is connected kinematically to the handle 32 and can be actuated during the transition of the handle 32 from the inactive condition to an actuation condition that is interposed between the inactive condition and the lifting condition.

In practice, the handle 32, during the transition between the inactive condition and the actuation condition, is adapted to operate on the first deactivation element 20b.

Figure 10:
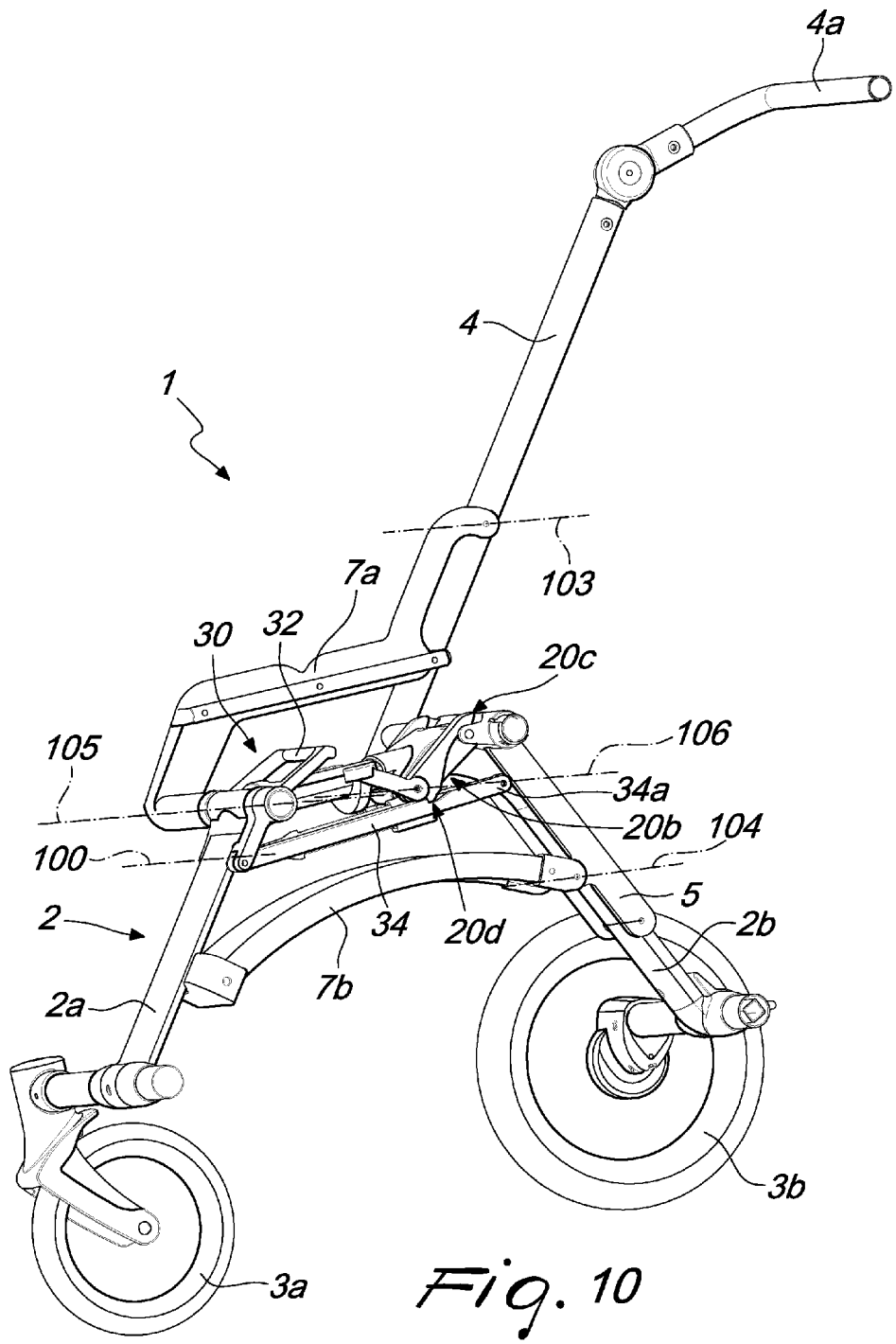
FIG. 10 is a perspective sectional view of the folding chassis along a longitudinal plane.

With particular reference to what has been shown in FIG. 10, provisions can be made for the strut 34, following the transition of the handle 32 from the inactive condition to the actuation condition, to be able to move along the guiding receptacle 36 without exerting, during this step, a pushing action on the linkage 5 but determining, thanks to the movement of a contoured portion 20d thereof, the rotation, about a pivoting axis 106, of a locking hook 20c which is part of the locking means 10.

Conveniently, this rotation occurs in contrast with the action of elastic means, constituted typically by a torsion spring, which are adapted to reactivate the locking means 10 constituted by the locking hook 20c when the folding chassis 1 is moved back into the extended condition.

Moreover, during the rotation of the handle 32 from the actuation condition towards the lifting condition and vice versa, the surface of the strut 34 that is uppermost during use keeps the locking hook 20c rotated in the release condition, preventing it from being able to accidentally move back into the locking condition, compromising the operations for closing or opening the folding chassis 1.

This solution makes it possible to provide, with the strut 34, both the first deactivation element 20b and the actuation device 31.

In order to ensure higher safety and avoid the risk of accidental closures of the chassis 1, conveniently the deactivation device 20 may also have a second deactivation element 20a that can be actuated independently of the first deactivation element 20b.

This second deactivation element 20a comprises a release button 21 which is connected, by means of a kinematic connection assembly, to the locking means 10.

The release button 21 is supported by the lower frame 2 and is advantageously arranged laterally with respect to the handle 32 so that the user can operate it with a finger of the same hand with which he grips the handle 32.

As shown in the figures, it is possible to provide two release buttons 21 arranged on opposite sides of the handle 32 and mutually connected so that both can actuate the locking means 10.

This constructive choice allows equal use of the right hand and the left hand to grip the handle 32, being able, in both cases, to press one button 21 or the other with the thumb of the hand that engages the handle 32.

If the second deactivation element 20a is provided, the further movement of the handle 32 from the actuation condition towards the lifting condition in order to cause the actuation of the actuation device 21 is allowed only after actuating not only the first deactivation element 20b but also the second deactivation element 20a, said deactivation elements 20a, 20b being, as explained previously, able to be actuated independently of each other.

According to a preferred embodiment, the handle 32 is articulated rotatably to the lower frame 2 about an articulation axis 105 which is substantially parallel to the interconnection axis 100.

In this manner, by operating the handle 32 exclusively with one hand, one actuates sequentially the deactivation device 20 of the locking means 10, the actuation device 31 and finally the lifting device 30.

The use of a folding chassis 1 according to the invention is evident from what has been described above.

In particular, the operation for opening the folding chassis 1 can be performed according to traditional methods by unlocking, if provided, the elements for keeping the chassis in the collapsed or closed condition and by operating, typically with an upward traction, the grip means 4a, which are integral with the upper posts 4, in order to extend the folding chassis 1, moving the pivoting axis beyond the equilibrium point or subfulcrum point until the locking means 10 are activated in the completely extended condition.

If instead one wishes to move the folding chassis 1 from the extended open condition to the collapsed closed condition, after having optionally, but not necessarily in all the embodiments, removed the seat of the pushchair, the car seat or the bassinet from the chassis, one proceeds to deactivate the locking means 10, to grip the handle 30 and to actuate the actuation device 31 so as to move away the pivoting axis 101 from the rear posts 2b, so as to exceed the equilibrium point and move the folding chassis 1 into the collapsed closed condition due to its own weight.

With reference to the embodiment shown and described in detail, it is possible to deactivate the locking means 10 directly with the hand that grips the handle 32 that provides the grip 30.

In fact, it will be possible to move the handle 32 about its own articulation axis towards the activation condition of the first deactivation element 20b by pressing at the same time, with a finger of the same hand that grips the handle 32, the actuation button 21 that provides the second deactivation element 20a.

Once both the first deactivation element 20a and the second deactivation element 20b have been actuated, it is possible to further rotate the handle 32 from the activation condition to the lifting condition so as to move, by means of the movement of the lever system 34, the interconnection linkage 5 so as to move the folding chassis 1 beyond the equilibrium condition.

In practice it has been found that the chassis according to the invention achieves the intended aim.

All the characteristics of the invention indicated above as advantageous, convenient or the like, may also be omitted or replaced with equivalents.

Thus, for example, the actuation device 21 as well as the deactivation device 20 of the locking means 10 can be provided by using cables, for example sheathed cables, that connect actuation bodies, which are arranged advantageously proximate to the grip 30, respectively with pushers, which operate for example between the rear posts 2b and the interconnection linkage 5, and with locking hooks.

Moreover, the same inventive concept can be used also on folding chassis provided with a covering or seat that cannot be removed from the folding chassis itself during the operations for transition from the extended condition to the collapsed condition and vice versa.

In this case it is convenient to provide an access, for example constituted by an opening that passes through a portion of the seat, in order to allow the user to access the grip 30 and the actuation means 31.

The individual characteristics presented with reference to general teachings or particular embodiments may all be present in other embodiments or may replace characteristics in these embodiments.

The invention thus conceived is susceptible of numerous modifications and variations, all of which are within the scope of the appended claims.

All the details may further be replaced with other technically equivalent elements.

In practice, the materials used, as long as they are compatible with the specific use, as well as the contingent shapes and dimensions, may be any according to the requirements.

The invention claimed is:

1. A folding chassis for push-chairs and baby carriages, comprising:
   a lower frame, which has at least one front post and at least one rear post, which are connected in a lower region to respective wheel assemblies;
   at least two upper posts, each of which supports grip means and can move with a combined rotary motion and a translational motion with respect to said lower frame during the transition of said chassis from an extended open condition to a collapsed closed condition;

at least one interconnection linkage, which is articulated rotatably to said at least two upper posts and to said at least one rear post about a first articulation axis and a second articulation axis;

means for kinematic interconnection between said at least two upper posts and said lower frame;

said interconnection linkage and said kinematic interconnection means provide for relative motion between said at least one front post, said at least one rear post and said at least two upper posts during the transition of said chassis from the extended open condition to the collapsed closed condition and vice versa, locking means which can be activated, as a consequence of the transition of said chassis from the collapsed closed condition to the extended open condition, and can keep said chassis in the extended open condition, a deactivation device, which deactivates said locking means in order to allow the transition of said chassis from said extended open condition to said collapsed closed condition, wherein at least one grip device and at least one actuation device are connected to said lower frame, said actuation device is actuated when said locking means is deactivated and said grip device is rotated by a user, wherein said first articulation axis is moved away from said at least one rear post, by means of a movement of said at least one interconnection linkage or of said at least two upper posts, such that said chassis moves beyond a position of equilibrium and moves towards the collapsed closed condition, wherein said at least one front post is articulated rotatably to said at least one rear post about at least one interconnection axis, and wherein said kinematic interconnection means comprising:

at least two upper traction elements pivoted to said rear post at a front region, said at least two upper traction elements being arranged proximate to said interconnection axis, each of said at least two upper traction elements being coupled rotatably to said at least one upper post about a third articulation axis, wherein the third articulation axis is parallel to said interconnection axis, and at least one lower traction element pivoted to said at least one front post and is coupled rotatably to said at least one interconnection linkage about a fourth articulation axis, wherein the fourth articulation axis is parallel to said interconnection axis.

2. The folding chassis according to claim 1, wherein said grip device comprises a handle that is movable, along a movement path, with respect to said lower frame.

3. The folding chassis according to claim 1, wherein said grip device comprises a handle which is articulated to said lower frame.

4. The folding chassis according to claim 3, wherein said handle can move, with respect to said lower frame, so as to shift between an inactive condition and a lifting condition.

5. The folding chassis according to claim 3, wherein said actuation device is connected kinematically to said handle.

6. The folding chassis according to claim 4, wherein said actuation device can be actuated following the transition of said handle from said inactive condition to said lifting condition.

7. The folding chassis according to claim 3, wherein said actuation device comprises a lever system which is connected to said handle and is adapted to operate by pushing against said interconnection linkage.

8. The folding chassis according to claim 3, wherein said deactivation device is connected to said handle.

9. The folding chassis according to claim 4, wherein said deactivation device has a first deactivation element and a second deactivation element, which can be actuated independently of each other.

10. The folding chassis according to claim 9, wherein said first deactivation element is connected kinematically to said handle, said handle being movable between said inactive condition and a condition of actuation of said first deactivation element, said actuation condition being interposed between said inactive condition and said lifting condition.

11. The folding chassis according to claim 9, wherein said second deactivation element comprises a release button which is connected to said locking means.

12. The folding chassis according to claim 11, wherein said release button is arranged proximate to said handle.

13. The folding chassis according to claim 3, wherein said handle is articulated rotatably to said lower frame about an articulation axis which is substantially parallel to said interconnection axis.

14. The folding chassis according to claim 7, wherein said lever system comprises at least one strut which terminates in a working end which is adapted to operate by pushing against said interconnection linkage in order to move said pivoting axis beyond said equilibrium condition.

15. The folding chassis according to claim 14, wherein said at least one strut is guided along a guiding receptacle which is articulated to said lower frame.

16. The folding chassis according to claim 14, wherein said handle, during the transition between said inactive condition and said actuation condition, is adapted to move said at least one strut along said guiding receptacle in order to cause, by means of a movement of a contoured portion thereof, the rotation, about a pivoting axis, of a locking hook which forms said locking means.

17. The folding chassis according to claim 9, wherein the further movement of said handle from said actuation condition to said lifting condition in order to cause the actuation of said actuation device is allowed once said second deactivation element has been actuated.

* * * * *